June 13, 1967    J. A. MASON ETAL    3,324,982
MAGNETIC CLUTCH OR BRAKE AND ARMATURE THEREIN
Filed Oct. 28, 1964
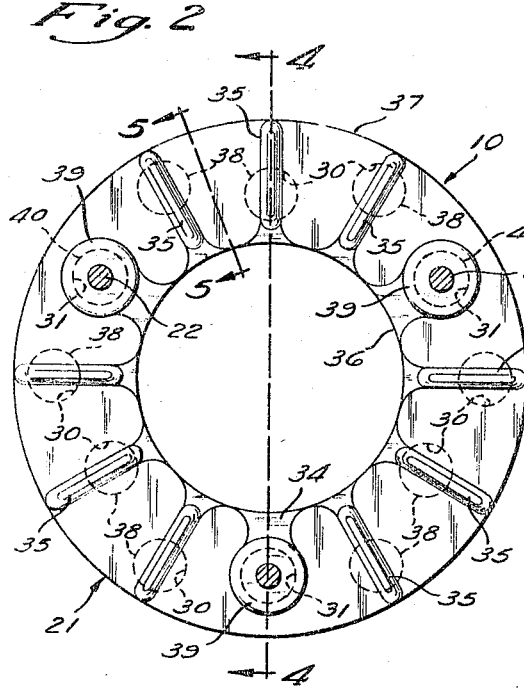
Fig. 2
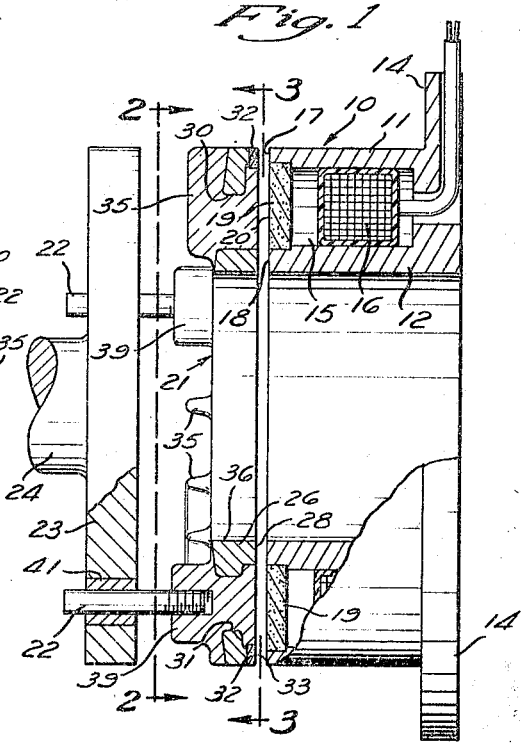
Fig. 1
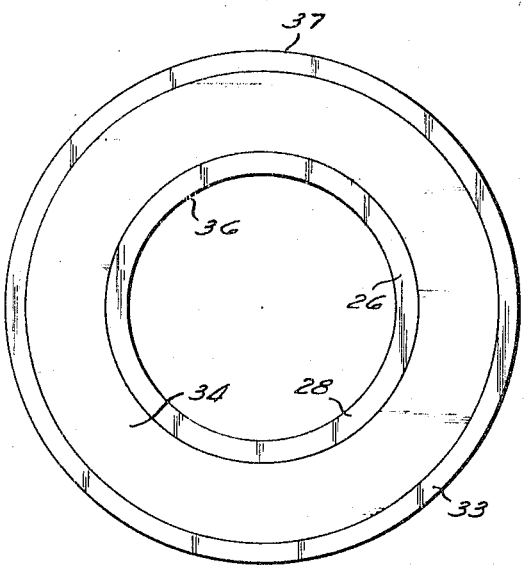
Fig. 3
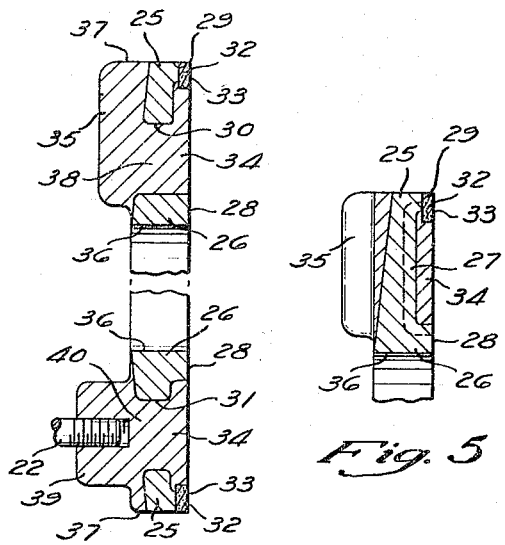
Fig. 4
Fig. 5
INVENTORS
JAMES A. MASON,
JAMES H. MEISTER
BY
Ely, Golrick & Flynn
ATTORNEYS

United States Patent Office 3,324,982
Patented June 13, 1967

3,324,982
MAGNETIC CLUTCH OR BRAKE AND ARMATURE THEREIN
James A. Mason, Shaker Heights, and James H. Meister, Brooklyn, Ohio, assignors to Fawick Corporation, a corporation of Michigan
Filed Oct. 28, 1964, Ser. No. 407,066
15 Claims. (Cl. 192—84)

This invention relates to a magnetic clutch or brake and to an armature for use therein.

In certain types of magnetic clutches or brakes, the magnetically attractable armature serves as one of the two relatively rotatable, frictionally-engageable, torque-sustaining bodies which are required to carry the clutching or braking load. The torque-sustaining capacity of such clutches or brakes has been limited by the heat produced when the two relatively rotatable, torque-sustaining bodies are brought into frictional engagement with each other. In such clutches or brakes, the armature usually was substantially entirely of ferromagnetic steel which, because of its relatively moderate heat conductivity, had only a relatively limited ability to dissipate the frictionally generated heat. To overcome this limitation, various special armature constructions have been proposed, but these have been relatively complicated and expensive, as well as having other disadvantages.

Another disadvantage of such clutches and brakes has been the necessity of providing a physical air gap between the armature and the body structure when the clutch or brake was engaged. In the absence of such an air gap, the remanent magnetization of these parts would tend to maintain them engaged even after the magnetizing coil is de-energized. The presence of such an air gap increases the overall magnetic reluctance of the flux path in the clutch or brake and thereby tends to reduce its torque-sustaining capacity.

In accordance with one aspect of the present invention, the torque capacity of a magnetic clutch or brake is increased by providing a novel one-piece armature which is adapted to more effectively dissipate the frictionally generated heat from the frictionally-engaging, torque-sustaining surfaces of the clutch or brake when it is applied.

In accordance with another aspect of this invention, the operation of a magnetic clutch or brake is improved by providing semi-magnetic material at one pole tip of one of the relatively rotatable parts in the magnetic circuit of the clutch or brake, so that there is no necessity for a physical air gap in the magnetic circuit when the clutch or brake is energized, so as to insure a quick release of these parts when the clutch or brake is de-energized.

Accordingly, it is an object of this invention to provide a novel and improved magnetic clutch or brake of the type having a magnetically attractable armature which is one of the frictionally engageable, torque-sustaining bodies in the clutch or brake.

Another object of this invention is to provide a novel and improved armature for such a clutch or brake.

Another object of this invention is to provide such a clutch or brake having an increased torque-sustaining capacity.

Another object of this invention is to provide a novel and improved armature for such a clutch or brake which is adapted to dissipate the frictionally generated heat more effectively, thereby improving the torque-sustaining capacity of the clutch or brake.

Another object of this invention is to provide such a magnetic clutch or brake having no physical air gap in its magnetic circuit when engaged.

Another object of this invention is to provide a novel and improved armature which enables the provision of a no-air-gap magnetic clutch or brake.

Another object of this invention is to provide such a novel and improved armature for a magnetic clutch or brake which is of rugged and simplified one-piece construction.

Further objects and advantages of this invention will be apparent from the following detailed description of a presently-preferred embodiment thereof, which is illustrated in the accompanying drawing.

In the drawing:

FIGURE 1 is an axial sectional view of a magnetic brake in accordance with the present invention;

FIGURE 2 is an elevational view of the back side of the armature in this brake;

FIGURE 3 is an elevational view of the front, working face of this armature;

FIGURE 4 is an axial section through the armature, taken on an enlarged scale in FIG. 2 and broken away for clarity; and FIGURE 5 is a fragmentary section through this armature, taken along the line 5—5 in FIG. 2.

Referring to FIG. 1, the magnetic brake shown therein has a body or magnet field structure 10 of known construction. This body structure 10 is of ferromagnetic material and is of bifurcated annular shape, presenting an outer annular leg 11, an inner annular leg 12 spaced radially inward from the outer leg and concentric therewith, and a back wall and mounting flange 14 joining the outer and inner legs. The body structure 10 defines an annular recess 15 between its outer and inner legs which snugly receives an electrically energizable, annular coil 16. The outer and inner legs 11 and 12 of the body structure present annular, coplanar, outer and inner pole tips 17 and 18, respectively. An annular wear pad 19 of suitable frictional material is rigidly positioned on body 10 between the latter's outer and inner legs 11 and 12, with the flat, annular, front end face 20 of this wear pad coplanar with the pole tips 17 and 18 and exposed for frictional engagement with a magnetically attractable armature 21.

The armature 21 is coupled through pins 22 to the flange 23 of a rotatable shaft 24 which is to be braked by the present brake. As explained hereinafter, this coupling arrangement is such that the armature 21 rotates in unison with shaft 24 but is adapted to move longitudinally or axially with respect to the shaft, toward or away from the body 10.

In accordance with the preferred embodiment of the present invention, the armature includes a malleable iron body, which provides a high permeability path for magnetic flux, and portions of non-magnetic, high heat conductivity material, preferably aluminum, fused to the malleable iron body and arranged to effectively dissipate heat from the frictionally engageable front working face of the armature. Preferably, also, one pole tip of the armature is constituted by semi-magnetic material which enables the flow of magnetic flux through the armature when coil 16 is energized, but acts as an effective air gap to enable the quick release of the armature when the coil is de-energized.

The malleable iron body comprises an outer ring 25, an inner ring 26 spaced radially inward from, and concentric with, the outer ring, and a generally annular, radially extending intermediate connecting portion 27 (FIG. 5) which joins the outer and inner rings 25 and 26 integrally to each other. The inner ring 26 presents a continuous, flat, annular front face 28 which is disposed a substantial distance in front of the intermediate connecting portion 27 and is exposed at the front of the armature. This face 28 constitutes an annular inner pole tip of the armature which is aligned longitudinally with the inner pole tip 18 of the body structure 10.

The outer ring 25 of the malleable iron body presents a continuous, flat, annular front face 29 which is spaced behind the plane of the inner pole tip 28 of the armature. A semi-magnetic ring 32 is bonded to this front face 29 of the outer ring 25 on the malleable iron body. This semi-magnetic ring 32 presents a continuous, substantially flat, annular front face 33 which is coplanar with the inner pole tip 28 of the armature. This front face 33 constitutes the outer pole tip of the armature, and it is aligned longitudinally with the outer pole tip 17 on the body structure 10. Preferably, as shown in FIG. 1, the semi-magnetic ring 32 extends radially inward slightly beyond the radially inward edge of pole tip 17.

As shown by the dashed line in FIG. 5, the magnetic flux path through the armature is by way of the semi-magnetic ring 33, the outer ring 25 on the malleable iron body, the radially extending, intermediate connecting portion 27, and the inner ring 26.

The semi-magnetic ring 32 preferably is a sintered body of finely divided, high permeability iron particles in a bonding medium of graphite or other suitable lubricant. However, if desired, these particles and this bonding medium may be molded under pressure to produce the semi-magnetic ring 32. By "semi-magnetic" is meant that this ring has sufficiently high permeability that it will conduct magnetic flux readily when coil 16 is energized, but it also has a sufficiently low magnetic retentivity that it will de-magnetize substantially completely and act effectively as a non-magnetic "air" gap to enable release of the brake or clutch promptly as soon as coil 16 is de-energized. Apparently, the non-magnetic interstices between the ferromagnetic iron particles in this sintered or molded body enable it to de-magnetize substantially completely as soon as magnetic flux is no longer induced in it.

The intermediate connecting portion 27 of the armature is formed with a first series of longitudinal openings 30 (FIG. 2) and a second series of openings 31.

In making the armature 21, the semi-magnetic ring 32 is first sintered to the front face 29 of the outer ring 25 on the malleable iron body. Then, the malleable iron body, with the semi-magnetic ring 32 attached, is put in a suitably shaped mold into which molten aluminum is poured to provide the non-magnetic, high heat conductivity portions of the armature to be described next.

The completed armature at its front, working face has a non-magnetic aluminum ring 34 which is disposed radially between the outer semi-magnetic ring 32 and the inner malleable iron ring 26, as shown in FIGS. 1, 3 and 4, and directly in front of the intermediate connecting portion 27 of the malleable iron body, as shown in FIG. 5. This aluminum ring 34 is longitudinally aligned with the frictional wear pad 19 carried by the body structure 10 between its pole tips. The front face of the aluminum ring 34 is substantially flat and coplanar with the pole tips 33 and 28 of the armature.

At its opposite, back face the armature has a plurality of longitudinally projecting, radially elongated, heat radiating, aluminum fins 35. These fins are spaced apart circumferentially around the armature, and each extends radially for substantially the complete radial extent of the armature between its inner and outer circumferential edges 36 and 37, as shown in FIG. 2. These fins are joined integrally to the aluminum ring 34 at the front of the armature by respective longitudinally extending aluminum neck segments 38 which are received in the aforementioned first series of openings 30 in the radially extending, intermediate portion 27 of the malleable iron body.

Also, at its back side the armature has a plurality of circumferentially spaced, longitudinally projecting aluminum bosses 39, here shown as three in number. These bosses are connected integrally to the aluminum ring 34 at the front of the armature by respective longitudinally extending aluminum neck segments 40 (FIGS. 1 and 3) which are snugly received in the aforementioned second series of openings 31 in the intermediate portion 27 of the malleable iron body.

The coupling pins 22 (FIG. 1) are secured in drilled and tapped holes in the bosses 39 on the armature and they project longitudinally rearward, parallel to the rotational axis of the assembly. Each of these pins 22 is slidably received in correspondingly located anti-friction bushings 41 carried by the flange 23 on shaft 24.

In the operation of this brake, when the coil 16 is energized it induces magnetic flux in the body or field magnet structure 10 which attracts the armature 21 magnetically to the right in FIG. 1, to close the air gap between their respective confronting pole tips. The outer and inner pole tips 33 and 28 of the armature respectively engage the outer and inner pole tips 17 and 18 of the body structure 10, and the aluminum ring 34 at the front of the armature frictionally engages the frictional wear pad 19 on the body structure 10 to absorb the torque of the previously rotating shaft 24. That is, the frictional braking load is substantially completely imposed on the front working face of aluminum ring 34 and the abutting face 20 of the frictional wear pad 19. Consequently, due to the friction between these engaging faces, considerable heat is generated. The aluminum neck portions 38, which join the aluminum ring 34 to the fins 35, conduct most of this heat directly to the fins 35 which radiate it to the atmosphere. Since this heat flow path in the armature is of high heat conductivity aluminum, the heat is dissipated rapidly from the frictionally engaging faces of the brake. Because of the greatly increased heat-dissipation capabilities of the armature, the brake is able to effectively brake a correspondingly higher shaft torque without overheating.

The rate of wear on the working face of the armature and on the working face of the body structure 10 is determined by the slowest wearing material there, because each of these faces is substantially flat. That is, the aluminum ring 34 cannot wear substantially faster than the pole tips of the armature, for example.

Due to the semi-magnetic nature of the ring 32 the present brake does not have a true air gap when engaged. That is, when coil 16 is energized, the outer pole tip 33 of the armature directly engages the outer pole tip 17 of the body structure 10 and the inner pole tip 28 of the armature directly engages the inner pole tip 18 of the body structure 10, and therefore the complete flux path has a lower magnetic reluctance than would be the case if there were an actual physical air gap separating cooperating pole tips of the armature 21 and the body structure 10 when the coil is energized. Moreover, when the coil is de-energized, the semi-magnetic ring 32 acts as an effective air gap, de-magnetizing substantially completely and permitting the quick release of the armature 21 from the body structure 10.

The same improved operating advantages are obtained where the armature is embodied in a magnetic clutch.

While a presently-preferred embodiment of this invention has been described in detail and illustrated in the accompanying drawing, it is to be understood that the invention is susceptible of other physical embodiments and that various modifications, omissions and refinements which depart from the disclosed embodiment may be adopted without departing from the spirit and scope of this invention. For example, if desired, the semi-magnetic pole tip member may be provided at the inner pole tip of the armature or at either pole tip of the body structure associated with the magnetizing coil. Also, the semi-magnetic pole tip member may be provided on an armature different from the heat-dissipating armature shown, or the heat-dissipating construction of the armature may be provided in an armature which does not have the semi-magnetic pole tip member.

We claim:
1. A magnetic clutch or brake comprising a ferromagnetic body structure presenting laterally spaced pole tips, friction material on said body structure between said pole tips, coil means inductively associated with said body structure to induce magnetic flux therein, and a magnetically attractable, cast, one-piece armature having a front face in confronting relationship to said pole tips and said friction material on said body structure, said armature presenting laterally spaced magnetizable pole tips at its front face which are longitudinally aligned respectively with said pole tips on said body structure, aluminum disposed between said armature pole tips at said front face of the armature and presenting an exposed working face aligned longitudinally with said friction material on said body structure for frictional torque-sustaining engagement therewith, and a ferromagnetic iron portion in said armature behind said aluminum joining said armature pole tips to each other and completing a path for magnetic flux between them, said aluminum being fused to said last-mentioned ferromagnetic iron portion, heat radiating aluminum fins at the back of the armature, and connecting aluminum segments joining said aluminum at said front face of the armature integrally to said fins to provide a heat conduction path between them.

2. A magnetic clutch or brake comprising a ferromagnetic body structure presenting an outer annular pole tip and an inner annular pole tip spaced radially inward therefrom, friction material on said body structure between said outer and inner pole tips, electrically energizable coil means on said body structure for inducing magnetic flux therein, and a magnetically attractable armature in confronting relationship to said pole tips and said friction material on said body structure and movable longitudinally toward and away from the latter, said armature being a cast, one-piece body having an outer iron ring, an inner iron ring spaced radially inward from said outer ring, outer and inner, magnetizable, annular pole tips on said rings at the front of the armature which are longitudinally aligned respectively with said outer and inner pole tips on said body structure, an aluminum ring at the front of the armature between said outer and inner rings and fused to both and aligned longitudinally with said friction material on said body structure for frictional torque-sustaining engagement therewith, a ferromagnetic iron portion behind said aluminum ring fused to the latter and joining said outer and inner rings integrally to each other and completing a magnetic flux path between said outer and inner pole tips on the armature, heat radiating aluminum fins at the back of the armature, and connecting aluminum segments joining said aluminum ring integrally to said fins to provide a heat conducting path between them and fused to said last-mentioned ferromagnetic iron portion.

3. A magnetic clutch or brake comprising a ferromagnetic body structure presenting an outer annular pole tip and an inner annular pole tip spaced radially inward therefrom and substantially coplanar therewith, friction material on said body structure between said outer and inner pole tips, electrically energizable coil means on said body structure for inducing magnetic flux therein, and a magnetically attractable armature in confronting relationship to said pole tips and said friction material on said body structure and movable longitudinally toward and away from the latter, said armature being a cast one-piece, annular body having an outer ferromagnetic iron ring and an inner ferromagnetic iron ring spaced radially inward from said outer ring, outer and inner, magnetizable, annular pole tips on said rings which are substantially coplanar with each other at the front face of the armature and are longitudinally aligned respectively with said pole tips on said body structure, a ferromagnetic iron portion spaced behind said armature pole tips and extending radially between said outer and inner rings and joining the latter integrally to each other to complete a magnetic flux path between said armature pole tips, an aluminum ring disposed in front of said last-mentioned iron portion and extending radially between said outer and inner rings and presenting a flat front surface coplanar with said armature pole tips which is longitudinally aligned with said friction material on said body structure for frictional torque-sustaining engagement therewith, said aluminum ring being fused directly to said last-mentioned iron portion and to said outer and inner rings, a plurality of longitudinally projecting, heat-radiating fins at the back of the armature, and spaced, longitudinally extending aluminum segments in the armature embedded in and fused to said last-mentioned iron portion and connecting said fins integrally to said aluminum ring and providing a heat conduction path between the latter.

4. A magnetic clutch or brake comprising a ferromagnetic body structure presenting spaced pole tips, coil means inductively associated with said body structure to induce magnetic flux therein, and a magnetically attractable armature structure presenting a front face in confronting relationship to said pole tips on said body structure and being mounted for movement toward and away from said pole tips, said armature structure comprising spaced magnetizable pole tips at its front face, and material interconnecting said armature pole tips and completing a magnetic flux path between them, one of said pole tips on one of said structures being composed of material adapted to conduct magnetic flux induced therein when said coil means is energized and to de-magnetize substantially completely when said coil means is de-energized.

5. A magnetic clutch or brake comprising a ferromagnetic body structure presenting spaced flat pole tips which are substantially coplanar with each other, friction material on said body between said pole tips, coil means inductively associated with said body structure to induce magnetic flux therein, and a magnetically attractable armature structure presenting a front face in confronting relationship to said pole tips and to said friction material on said body structure, said armature structure being mounted for movement toward and away from said pole tips and said friction material on said body structure, said armature structure comprising spaced magnetizable flat pole tips at its front face which are substantially coplanar with each other and are engageable respectively with said pole tips on said body structure when said coil means is energized, and ferromagnetic material joining said armature pole tips to each other and completing a magnetic flux path between them, one of said pole tips on one of said structures being composed of finely divided ferromagnetic particles fused to each other and having nonmagnetic interstices between them, said one pole tip being operative to conduct magnetic flux induced therein when said coil means is energized and to de-magnetize substantially completely when said coil means is de-energized.

6. A magnetic clutch or brake comprising a ferromagnetic body structure presenting spaced flat pole tips which are substantially coplanar with each other, friction material on said body between said pole tips, coil means inductively associated with said body structure to induce magnetic flux therein, and a magnetically attractable armature presenting a substantially flat front face in confronting relationship to said pole tips and said friction material on said body structure, said armature structure being mounted for movement toward and away from said pole tips and said friction material on said body structure, said armature comprising spaced magnetizable flat pole tips at its front face which are substantially coplanar with each other and are engageable respectively with said pole tips on said body structure when said coil means is energized, and ferromagnetic material connecting said armature pole tips to each other and completing a magnetic flux path between them, one of said armature pole tips being composed of material adapted to conduct magnetic flux induced therein when said coil means is energized and to de-magnetize substantially completely in response to de-energization of said coil means.

7. A magnetic clutch or brake comprising a ferromagnetic body structure presenting a flat outer annular pole tip and a flat inner annular pole tip spaced radially inward therefrom and substantially coplanar therewith, friction material on said body structure between said outer and inner pole tips, electrically energizable coil means on said body structure for inducing magnetic flux therein, and a magnetically attractable armature having a substantially flat front face in confronting relationship to said pole tips and said friction material on said body structure and movable longitudinally toward and away from the latter, said armature being a cast, one-piece body having an outer ferromagnetic iron ring, an inner ferromagnetic iron ring spaced radially inward from said outer ring, a semi-magnetic pole tip member of high permeability powder particles fused to each other and having nonmagnetic interstices between them, said semi-magnetic pole tip member being operative to conduct magnetic flux induced therein when said coil means is energized and to de-magnetize substantially completely when said coil means is de-energized, said semi-magnetic pole tip member being bonded to said outer ring and presenting an outer, flat, annular pole tip at the front of the armature, said inner ring presenting an inner, flat, annular pole tip at the front of the armature substantially coplanar with said outer armature pole tip, said outer and inner armature pole tips being engageable respectively with said outer and inner pole tips on said body structure, an aluminum ring at the front of the armature disposed between said outer and inner armature pole tips and presenting an exposed working surface substantially coplanar with said armature pole tips, said aluminum ring being longitudinally aligned with said friction material on said body structure for frictional torque-sustaining engagement therewith, a ferromagnetic iron portion behind said aluminum ring fused to the latter and joining said outer and inner iron rings integrally to each other and completing a magnetic flux path between said outer and inner armature pole tips, heat radiating aluminum fins at the back of the armature, and connecting aluminum segments connecting said aluminum ring integrally to said fins and providing a heat conduction path between them, said connecting aluminum segments being embedded in and fused to said last-mentioned ferromagnetic iron portion which joins said outer and inner iron rings.

8. An armature for a magnetic clutch or brake comprising a body having spaced magnetizable pole tips at its front face which are substantially coplanar with each other, non-magnetic metal of high heat conductivity disposed between said pole tips at said front face of the body and presenting an exposed working surface substantially coplanar with said pole tips, ferromagnetic metal behind said non-magnetic high heat conductivity metal joining said pole tips to each other and completing a path for magnetic flux between them, and heat-radiating fins of said non-magnetic, high heat conductivity metal spaced from said working surface and joined integrally to said non-magnetic, high heat conductivity metal thereat through connecting segments of said non-magnetic, high heat conductivity metal.

9. An armature for a magnetic clutch or brake comprising a cast, one-piece body having an outer annular magnetizable pole tip at the front of said body, an inner annular magnetizable pole tip at the front of said body spaced radially inward from said outer pole tip and disposed substantially coplanar therewith, an aluminum ring at the front of said body between said outer and inner pole tips, said aluminum ring presenting an exposed working surface substantially coplanar with said pole tips, a ferromagnetic iron portion behind said aluminum ring fused to the latter and joining said outer and inner pole tips to each other and completing a magnetic flux path between them, heat radiating aluminum fins at the back of said body, and connecting aluminum segments integrally joining said aluminum ring to said fins and fused to said last-mentioned iron portion.

10. An armature for a magnetic clutch or brake comprising a die cast annular body having an outer iron ring and an inner iron ring spaced radially inward from said outer ring, outer and inner flat annular magnetizable pole tips at said rings which are substantially coplanar with each other at the front face of the body, a connecting iron portion spaced behind said pole tips and extending radially between said outer and inner rings and joining the latter integrally to each other to complete a magnetic flux path between said pole tips, an aluminum ring disposed in front of said connecting iron portion and extending radially between said outer and inner rings and presenting a flat front surface coplanar with said pole tips, said aluminum ring being fused directly to said connecting iron portion and to said outer and inner rings, a plurality of longitudinally projecting, heat-radiating aluminum fins at the back of said body, and spaced, longitudinally extending aluminum segments in said body embedded in and fused to said connecting iron portion and connecting said fins integrally to said aluminum ring and providing a heat conduction path between them.

11. An armature for a magnetic clutch or brake comprising a body having spaced magnetizable pole tips and ferromagnetic material joining said pole tips to each other and completing a magnetic flux path between them, one of said pole tips being composed of material adapted to conduct inducted magnetic flux and to de-magnetize substantially completely when the flux is no longer induced.

12. An armature for a magnetic clutch or brake comprising an annular body presenting spaced, outer and inner flat annular, magnetizable pole tips which are substantially coplanar with each other and ferromagnetic material connecting said pole tips to each other and completing a magnetic flux path between them, one of said pole tips being composed of finely divided ferromagnetic particles fused to each other and having non-magnetic interstices between them, said one pole tip being adapted to conduct externally induced magnetic flux and to demagnetize substantially completely when the flux is no longer induced externally.

13. An armature for a magnetic clutch or brake comprising a body having spaced flat magnetizable pole tips at its front face which are substantially coplanar with each other, one of said pole tips being composed of semi-magnetic material adapted to conduct induced magnetic flux and adapted to de-magnetize substantially immediately when flux is no longer induced therein, non-magnetic material of high heat conductivity disposed between said pole tips at said front face of the body and presenting an exposed working face substantially coplanar with said pole tips, and ferromagnetic material behind said nonmagnetic material joining said pole tips to each other and completing a path for magnetic flux between them.

14. An armature for a magnetic clutch or brake comprising a cast, one-piece body having an outer ferromagnetic iron ring, an inner ferromagnetic iron ring spaced radially inward from said outer ring, a semi-magnetic pole tip member of solidified high permeability powder on one of said rings and presenting a first flat pole tip at the front of the armature, said semi-magnetic pole tip member being adapted to conduct externally induced magnetic flux and to de-magnetize substantially completely upon removal of the externally-induced flux, the other of said rings presenting a second flat pole tip at the front of the armature substantially coplanar with said first pole tip, an aluminum ring at the front of said body between said pole tips and fused to both said rings, said aluminum ring presenting an exposed working surface substantially coplanar with said pole tips, a ferromagnetic iron portion behind said aluminum ring fused to the latter and joining said outer and inner rings integrally to each other, heat radiating aluminum fins at the back of the armature, and connecting aluminum segments integrally joining said aluminum ring to said fins and fused to said last-mentioned iron portion.

15. An armature for a magnetic clutch or brake comprising a cast annular body having an outer malleable iron ring and an inner malleable iron ring spaced radially inward from said outer ring, a semi-magnetic ring of sintered iron particles on the front of said outer ring and presenting a flat annular outer pole tip at the front of the armature, said semi-magnetic ring being adapted to be magnetized by externally-induced magnetic flux and to de-magnetize substantially completely when said flux is no longer induced, said inner ring presenting a flat annular inner pole tip which is substantially coplanar with said outer pole tip at the front of the armature, an intermediate, radially extending connecting portion of malleable iron spaced behind said pole tips and joining said outer and inner rings integrally to each other to complete a magnetic flux path between said pole tips, an aluminum ring disposed in front of said connecting iron portion and extending radially between said outer and inner pole tips and presenting an exposed flat front surface coplanar with said pole tips, said aluminum ring being fused directly to said connecting iron portion and to said outer and inner rings, a plurality of longitudinally projecting, heat-radiating aluminum fins at the back of the armature, and spaced, longitudinally extending aluminum segments in the armature embedded in and fused to said connecting iron portion and connecting said fins integrally to said aluminum ring and providing a heat conduction path between them.

References Cited

UNITED STATES PATENTS

| | | | |
|---|---|---|---|
| 903,945 | 11/1908 | Ast | 192—84 |
| 2,522,622 | 9/1950 | Laurant | 192—84 |
| 2,560,868 | 7/1951 | Hubert | 192—84 |
| 2,910,148 | 10/1959 | Ferrell et al. | |
| 2,942,710 | 6/1960 | Wiedmann | 192—84 |
| 2,952,802 | 9/1960 | Michelson | 317—165 |
| 2,982,385 | 5/1961 | Gamundi | 192—84 |

MARK NEWMAN, *Primary Examiner.*

DAVID J. WILLIAMOWSKY, *Examiner.*

A. T. McKEON, *Assistant Examiner.*